United States Patent

[11] 3,571,956

| [72] | Inventor | Robert C. Heiberg<br>2115 N.E. 59th Ave, Portland, Oreg. 97213 |
|---|---|---|
| [21] | Appl. No. | 721,801 |
| [22] | Filed | Apr. 16, 1968 |
| [45] | Patented | Mar. 23, 1971 |

[54] CABLE PLOW DRAFT LINKAGE
16 Claims, 6 Drawing Figs.

[52] U.S. Cl.................................................. 37/98,
172/742, 37/193, 172/744, 172/477, 172/677,
172/484, 172/206
[51] Int. Cl..................................................... E02f 5/02,
F16i 1/00
[50] Field of Search........................................... 172/742,
744, 447, 477, 667, 627, 669, 677, 484, 741, 2,
789, 446, 99, 206, 35, 292, 253, 254; 111/5;
37/(VD), 143, 1, 98, 193; 61/72.6, 72.5, 72.4,
75.3, 72.7, 72.1; 214/139, 134, 768, 138

[56] References Cited
UNITED STATES PATENTS

| 3,019,923 | 2/1962 | Morrison et al. | 172/667X |
|---|---|---|---|
| 3,024,851 | 3/1962 | Harres | 172/677X |
| 3,032,903 | 5/1962 | Ede | 37/193 |
| 3,060,696 | 10/1962 | Lang | 172/484X |
| 3,170,300 | 2/1965 | Kelley | 61/72.6 |
| 3,175,368 | 3/1965 | Tibbits, Jr. | 61/72.6 |
| 3,232,358 | 2/1966 | Heiberg | 172/742 |
| 3,249,244 | 5/1966 | Ellerbroek et al. | 214/138 |
| 3,252,604 | 5/1966 | Wiemann et al. | 214/138 |
| 3,298,547 | 1/1967 | Williams | 214/138 |
| 3,313,431 | 4/1967 | Kelly | 214/138 |

Primary Examiner—Robert E. Pulfrey
Assistant Examiner—Clifford D. Crowder
Attorney—Lee R. Schermerhorn ABSTRACT: A versatile plow for burying cable in a furrow behind a tractor or as much as 5 and ½feet beyond either side of the tractor and in a roadside ditch below the level of the tractor or in a roadside embankment abode the level of the roadway on which the tractor travels. Such wide lateral adjustment is provided by a special hitch block and such great range of vertical adjustment is provided by a special parallelogram linkage behind the hitch block. The hitch block places the parallelogram linkage in outboard position so that it can be lowered into a ditch at a distance to one side of the tractor.

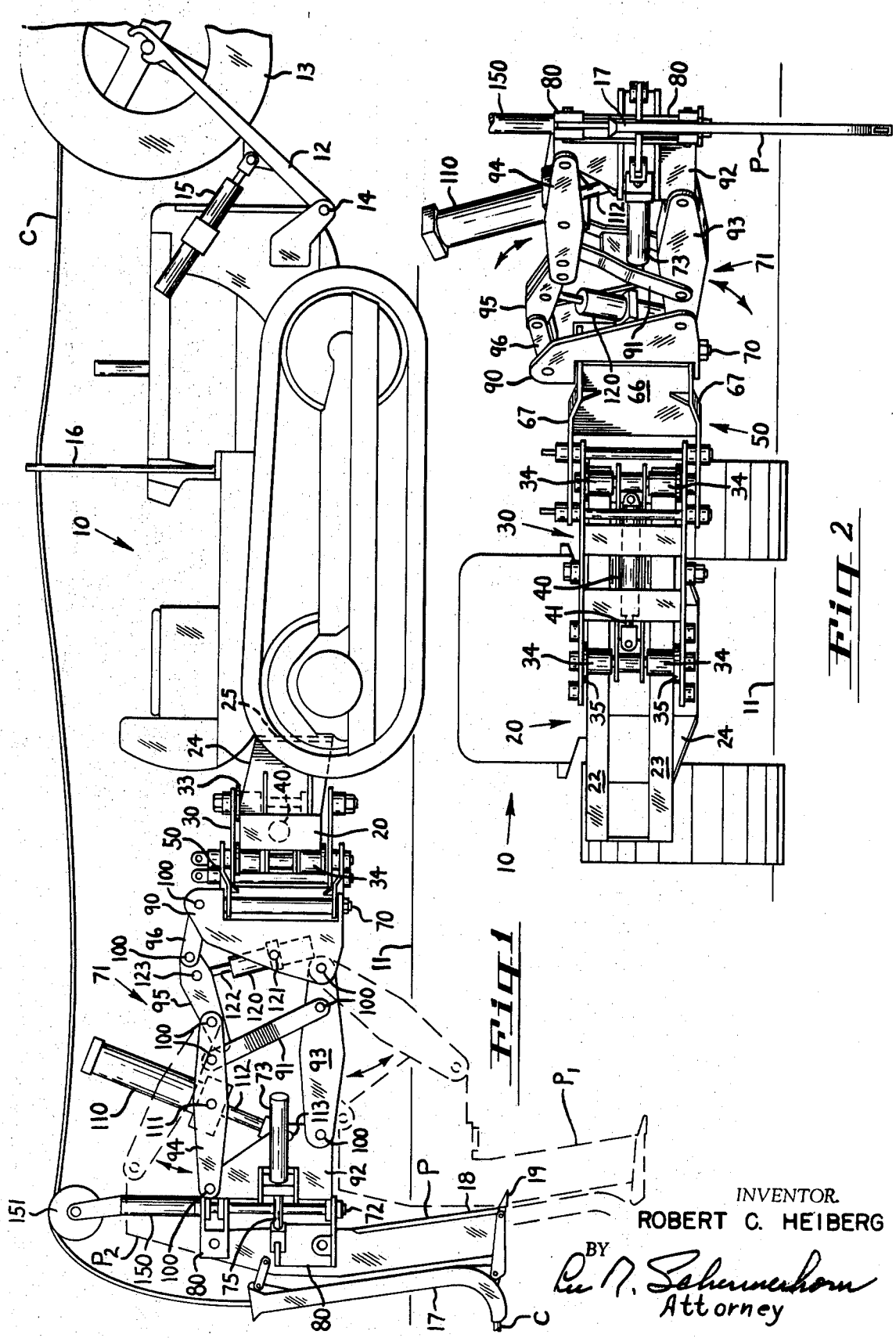

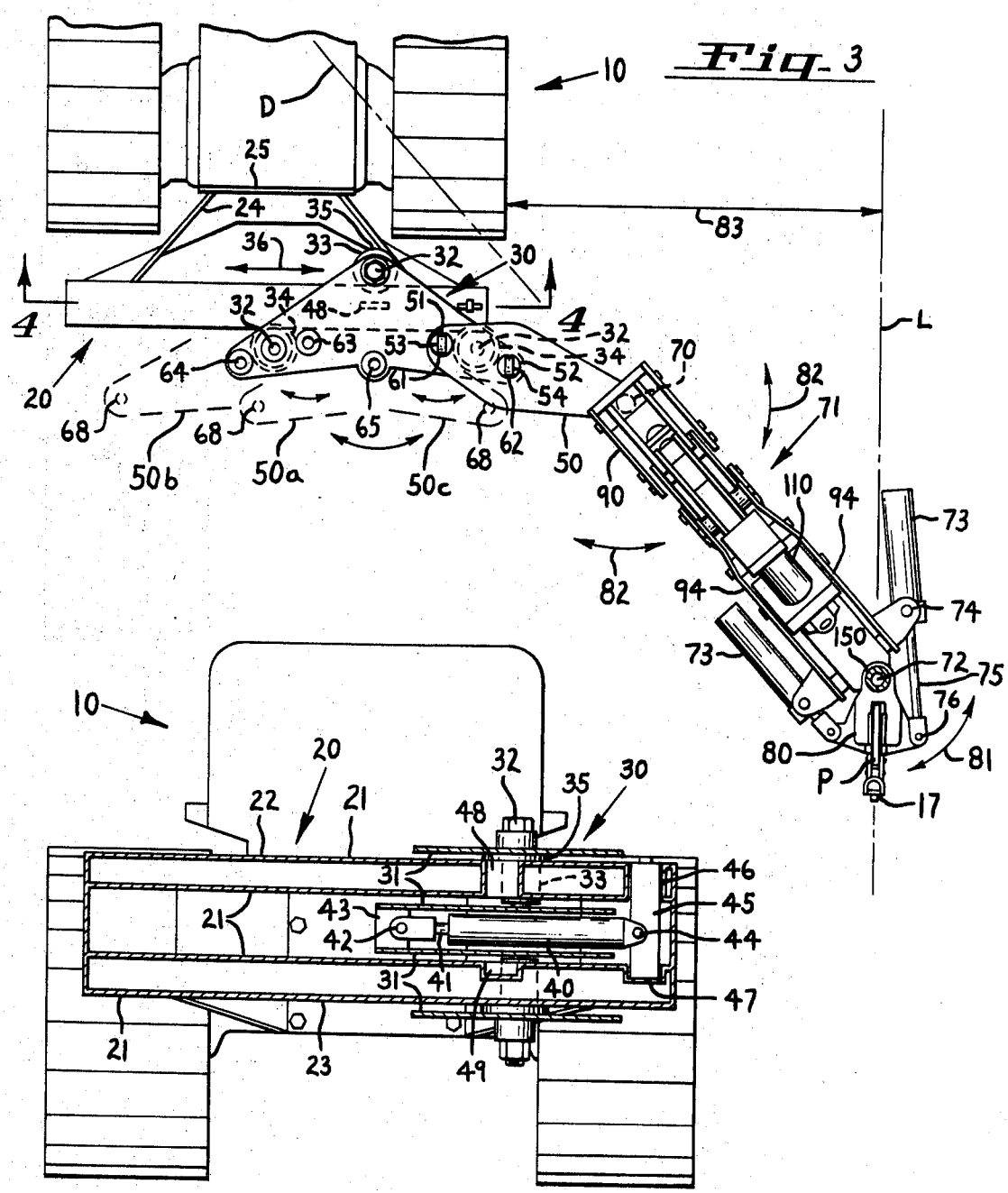

INVENTOR.
ROBERT C. HEIBERG
BY
Attorney 3,571,956

CABLE PLOW DRAFT LINKAGE

BACKGROUND OF THE INVENTION

This invention relates to a cable plow for laying cables and other conduits under ground.

The present plow is an improvement over the paravane plow disclosed in my Pat. No. 3,232,358. A paravane-type of plow is characterized by a a draft arm having a free swinging vertical pivot at its forward end and a plowshare mounted on a vertical pivot on the rear end of the draft arm, the angular relation between the plowshare and the draft arm being adjustable by a hydraulic cylinder. Thus, the plowshare may be steered as a rudder in the ground to lay a cable offset to one side of the free swinging pivot at the forward end of the draft arm.

In said patent, the free swinging pivot is incorporated in a tractor hitch which is mounted for sliding adjustment on a transverse track bar on the rear of the tractor. This arrangement permits the laying of a cable offset a short distance beyond either side of the tractor whereby the cable may be laid conveniently in the shoulder adjacent a paved roadway or close to a building, fence or pole line. The foregoing features are incorporated in the present plow with certain added improvements and advantages as will appear in the following description.

SUMMARY OF THE INVENTION

It is often desired to lay a cable or conduit at a greater distance beyond one side of the tractor than is possible with the plow described in my prior patent. For example, it may be desired to lay the cable at a distance of several feet from the edge of a paved roadway on which the tractor travels. The condition of the terrain may be such that the tractor itself must remain on the pavement. Also, it is sometimes desired to bury a cable in a line where the surface of the ground is considerably lower than the road surface on which the tractor travels as in burying a cable in the bottom of a ditch running along a roadway. Again, it may be necessary to bury the cable in an embankment at higher elevation than the roadway. The character of the terrain alongside the road may change from place to place, requiring facility of adjustment of the plow to meet the varying conditions described.

In the present construction the hitch block is equipped with an adjustable extension arm permitting the paravane to swing out much farther beyond the side of the tractor. This is of particular advantage where the tractor must remain on a paved road surface while burying a cable in a line several feet beyond the edge of the pavement.

The present construction also embodies a novel form of parallelogram linkage for raising and lowering the plowshare without tilting the plowshare forward or backward as the level of the terrain varies. The plowshare remains vertical in the bottom of a ditch below the road surface and in an embankment above the road surface. One arm of the linkage includes a device for changing its length so that the plow may be tilted up in an elevated inoperative position for travel on a road.

The parallelogram linkage forms the free swinging draft arm of the paravane, behind the tractor hitch. This allows the linkage to be lowered into a ditch at one side of the tractor without conflict with the shoulder of the ditch.

Objects of the invention are, therefore, to provide an improved paravane-type cable plow, to provide a plow which will bury a cable as much as 5½feet to either side of the tractor which pulls the plow, to provide a cable plow which will work with equal facility in the bottom of a ditch alongside a roadway on which the tractor travels and in an embankment above the roadway, to provide an improved hitch block and extension arm, to provide an improved parallelogram linkage for raising and lowering the plow, to provide means to shorten one arm of the parallelogram for raising and tilting a plow to inoperative position and to provide linkage modification equivalent to a parallelogram linkage.

The invention will be better understood and additional objects and advantages will become apparent from the following description of certain preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 1 is a side elevation view of a first embodiment of cable plow according to the invention, broken lines being used to show the parts in different positions of vertical adjustment;

FIG. 2 is a rear elevation view showing the plow offset beyond one side of the tractor;

FIG. 3 is a fragmentary top plan view showing the plow offset to one side as in FIG. 2 and showing in broken lines certain adjustments of the extension arm on the hitch block;

FIG. 4 is a view on the line 4—4 in FIG. 3;

DESCRIPTION OF THE PREFERRED EMBODIMENTS

Figure 5:
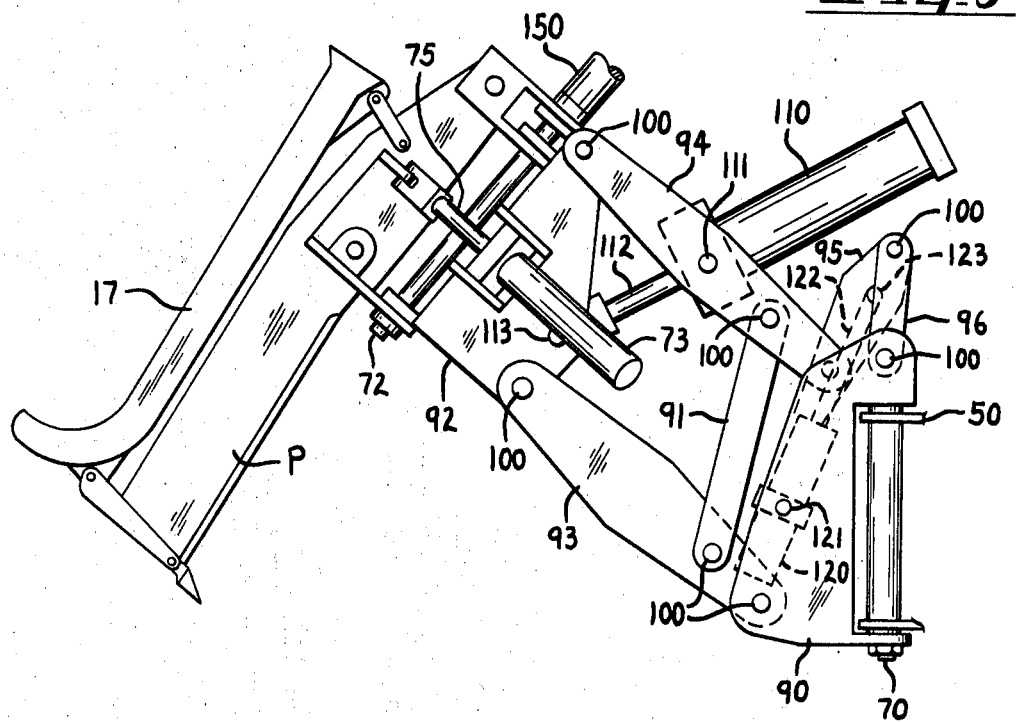
FIG. 5 is a side elevation view of the parallelogram linkage in FIG. 1, showing the plow tilted up to inoperative position.

In FIG. 1, the tractor 10 stands on road surface 11. A pair of arms 12 on the front of the tractor support a reel 13 carrying the cable C. Arms 12 are pivotally mounted at 14 and may be raised and lowered by hydraulic cylinders 15 to pick up and carry the reel. Cable C is trained over a support 16 and is paid out through a tube 17 on the rear edge of plowshare P.

Plowshare P is a flat blade symmetrical on its opposite sides having a cutting edge 18 on its leading edge to penetrate the ground when pulled forward. The lower end of the plowshare is equipped with a point 19 which forms an opening in the ground to receive the cable. After the plow has passed, the earth closes in behind the plowshare so that no opening is left to be backfilled. In operating position, the plowshare stands approximately vertical as shown in FIG. 1.

As best shown in FIGS. 3 and 4, a transverse track bar 20 is rigidly mounted in fixed position on the rear of the tractor. The length of track bar 20 is preferably slightly less than the width of the tractor. Track bar 20 comprises four horizontal plates 21 one above the other, the upper two being welded to vertical front and back plates to form an upper box beam or bar 22 and the two lower plates 21 being similarly welded to vertical front and back plates to form a lower box beam or bar 23. These beams are welded to a supporting bracket 24 which has a vertical mounting plate 25 bolted to the frame of the tractor.

Sliding hitch block 30 is of special construction. The hitch block comprises four triangular plates 31, the upper one being disposed above the beam 22, tee lowermost below the beam 23 and the two intermediate plates 31 in the space between beams 22 and 23 as shown in FIG. 4. The four plates 31 are interconnected by three vertical pins 32. These pins carry a pair of upper and lower rollers 33 engaging the front sides of beams 22 and 23 and two pairs of upper and lower rollers 34 engaging the rear sides of beams 22 and 23. Each roller has a flange 35 on one end. The flanges are on the upper ends of the upper rollers to overlie the top surface of upper beam 22 and on the lower ends of the lower rollers to underlie the bottom surface of bean 23 whereby the plates 31 are held out of contact with the beams 22 and 23 so that there is no sliding friction.

Hitch block 30 may be shifted along track bar 20 a s indicated by arrow 36. This is accomplished by a double acting hydraulic cylinder 40 disposed between the beams 22 and 23 and having a piston rod 41 connected at 42 with a block 43 which is welded to the two intermediate plates 31 of the hitch block. Cylinder 40 is connected by pin 44 with a vertical anchor bar 45. FIGS. 3 and 4 show anchor bar 45 inserted in an opening 46 in one end of upper beam 22 with its lower end seated in a socket 47 in beam 23. With the anchor bar in this position, piston rod 41 will move the hitch block between the right end and center of track bar 20. In FIGS. 3 and 4 the piston rod is fully retracted and hitch block 30 is in extreme right position on the track bar.

By removing pin 44, anchor bar 45 may be withdrawn and inserted in opening 48 and seated in socket 49. Then, when pin 44 is replaced, the piston rod 41 will move hitch block 30 between the center and left end of track bar 20. Thus, the two alternate positions provided for anchor bar 45 allow the hitch block to be located in any desired position along the track bar.

For plowing at maximum distance beyond the side of the tractor, the extension arm 50 is employed. The forward or inboard end of arm 50 has two spaced holes 51 and 52 to receive a pair or pins 53 and 54. These pins may be placed selectively in the various holes 61, 62, 63, 64 and 65 in hitch block 30. As shown in FIG. 3, pin 53 is in hole 61 and pin 54 is in hole 62, causing the extension arm 50 to project the maximum distance to the right. By removing pin 54, arm 50 may be rotated on pin 53 to the broken line position shown at 50a and then pin 54 may be placed in hole 65.

By removing both pins 53 and 54, the arm 50 may be shifted to the left side of the hitch block. Then, pin 53 is placed in hole 63. When pin 54 is placed in hole 64, the arm 50 will assume the position shown in broken lines at 50b and when pin 54 is placed in hole 65, arm 50 will assume the position shown at 50c. This provides considerable flexibility in the hitch by merely changing the positions of the pins 53 and 54.

Extension arm 50 is made amply stiff and strong by welding a deep vertical web plate 66 between a pair of horizontal top and bottom plates 67 as shown in FIG. 2. This forms an I-beam shape of great strength and stiffness. Gusset plates may also be provided as desired.

The free end of offset arm 50 is equipped with aligned vertical holes and bushings 68 to receive the vertical hinge pin 70 in FIG. 3. This hinge pin provides a draft connection for the leading end of a free swinging draft arm 71. A second vertical hinge pin 72 in the trailing end of draft arm 71 provides pivotal connection for the plow P. The angular relation between the plow P and draft arm 71 is controlled by one or more double acting hydraulic cylinders 73. In the present embodiment there are two cylinders 73, each pivotally mounted at 74 on the trailing end of the draft arm. Piston rods 75 are pivotally connected at 76 with the opposite sides of plowshare holder 80.

The plowshare being a flat blade symmetrical on its opposite sides, it acts as a rudder in the ground. The rudder movement of the plow relative to draft arm 71 is indicated by arrow 81 and the swinging movement of draft arm 71 on its free swinging hinge pivot is indicated by arrows 82. When cylinders 73 turn the plow clockwise away from alignment with draft arm 71, the rudder action of the plow in the ground swings the draft arm counterclockwise away from its natural trailing position behind its free swinging pivot 70, as shown in FIG. 3. Draft arm 71 swings out until the plowshare is aligned with its direction of travel as indicated by the line L. This is the action of a paravane. It is thereby possible to lay a cable as far as 5½feet away from either side of the tractor as represented by the dimension line 83.

Since draft arm 71 is free swinging on its hinge pin 70, the line of draft always follows the direction of the draft arm as indicated by the line D. With the parts proportioned as shown, it will be observed that the draft line D passes close to the centroid of the bearing areas where the tractor exerts its tractive effort against the surface of the ground or road. As a result, the obliquely directed pull of draft arm 71 does not exert an appreciable torque on the tractor which would tend to pull the tractor away from its straight forward line of travel. This is a highly desirable condition which cannot be obtained without a paravane-type of plow.

In the ideal condition, the line D would pass precisely through the vertical axis of the centroid of the bearing areas of the tractor tracks and the objectionable steering torque exerted on the tractor would be reduced to zero. Any geometric relationship reasonably close to such ideal is of great assistance to the tractor driver in assisting him to maintain a straight path of travel. The tractor hitch and paravane action are the same on opposite sides of the tractor whereby the same advantage is obtained when plowing on the left side.

In order to provide vertical adjustment of the plow, the draft arm 71 comprises a front member 90 which carries the free swinging hinge pin 70, a front parallelogram arm 91, a rear parallelogram arm 92 which carries the hinge pin 72, a lower parallelogram arm 93, an upper parallelogram arm 94 and toggle links 95 and 96. These parts are all pivotally connected by the pins 100 as shown in FIG. 1. In order to provide sufficient stiffness in the draft arm, these parts are formed of laterally spaced plates giving ample transverse dimension to the parts as shown in FIG. 2.

The working level of the plow is adjusted by a double acting hydraulic cylinder 110 pivotally mounted at 111 in the upper parallelogram 94. Piston rod 112 is pivotally connected to rear parallelogram arm 92 by pin 113. This cylinder will lower the plow through the parallelogram linkage to broken line position $P_1$ for plowing in a ditch or raise the plow to broken line position $P_2$ for plowing in an embankment. Throughout this range of movement, the parallelogram linkage keeps the plow in its approximately vertical position as desired for plowing.

The purpose of toggle linkage 95, 96 is to raise and tilt the plow to inoperative position as shown in FIG. 5. A double acting hydraulic cylinder 120 is pivotally mounted at 121 on front member 90. Piston rod 122 is pivotally connected with pin 123 in link 95. In normal plowing position, the links 95, 96 are disposed in approximately a straight line to resist the thrust of upper parallelogram arm 94 without requiring substantial force exerted by piston rod 122 to hold the links in working position. When piston rod 122 is extended, the toggle links fold upward and draw upper parallelogram arm 94 forward to raise and tilt the plow so that it will clear the roadway.

Figure 6:
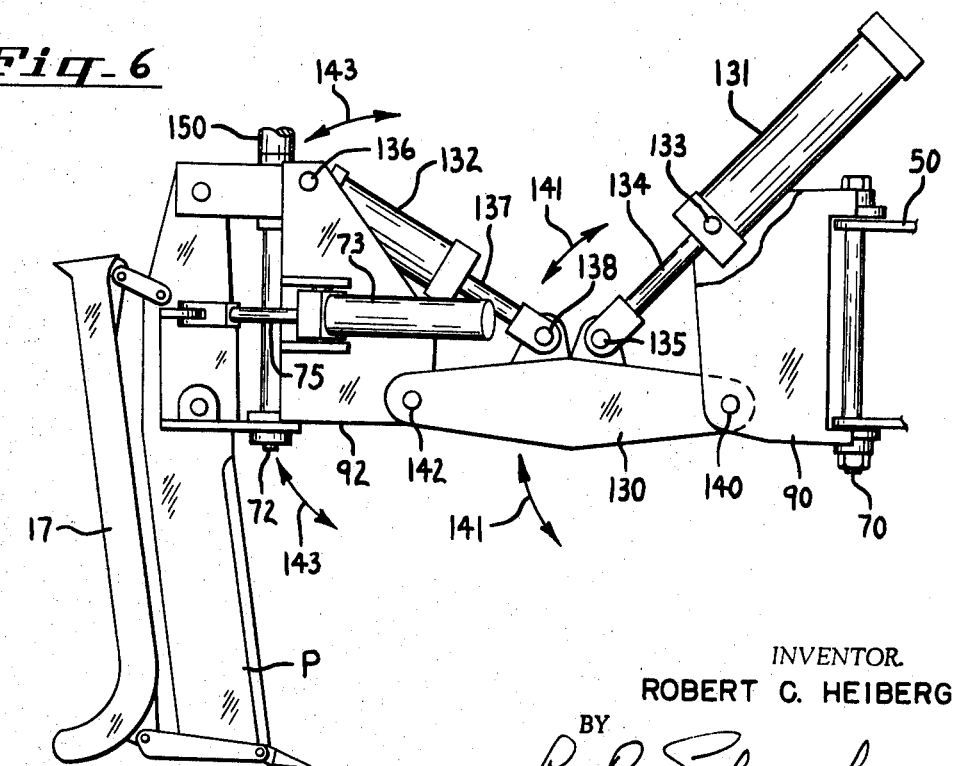
FIG. 6 is a side elevation view of a modification.

FIG. 6 shows a modification in which the draft arm comprises a single arm 130 and two double acting hydraulic cylinders 131 and 132. Cylinder 131 is pivotally mounted on pin 133 in front member 90 and its piston rod 134 is pivotally connected at 135 with a mid portion of arm 130. Cylinder 132 is pivotally mounted on pin 136 in the member 92 which carries the hinge pin 72 and has a piston rod 137 pivotally connected at 138 with a mid portion of the arm 130.

Cylinder 131 swings the plow about pivot 140 as indicated by arrows 141 and cylinder 132 swings the plow about pivot 142 as indicated by arrows 143. When both piston rods are retracted, the plow is raised and tilted to the same position shown in FIG. 5. The plow may be lowered and raised in parallel movement the same as with the parallelogram linkage in the first embodiment by retracting piston rod 137 as piston rod 134 is extended and by extending piston rod 137 as piston rod 134 is retracted. The linkage in FIG. 6 will move the plow to all the positions accomplished by the parallelogram linkage in FIGS. 1 and 5.

In both embodiments the plowshare holder 80 is equipped with a mast 150 on the axis of pin 72. This mast carries a sheave 151 to support the cable C and guide it into the upper end of tube 17.

Cable plows have heretofore been equipped with parallelogram linkages and other mechanisms for raising and lowering the plow but no prior known apparatus has been capable of burying a cable in the bottom of a ditch at a distance to one side of the tractor. This is because the vertical pivot for the forward end of the plow draft arm is too remote from the ditch, causing the arm to extend across the shoulder of the ditch whereby the shoulder prevents the arm from being lowered sufficiently to place the plow in the bottom of the ditch. In fact, in conventional cable plows the vertical pivot at the forward end of the draft arm is located on the longitudinal centerline of the tractor at considerable distance from the ditch.

This difficulty has been overcome in the present embodiments by providing means for shifting the hitch block 30 toward one side of the tractor and then providing extension arm 50 to place the vertical pivot 70 substantially over the ditch at a from the side of the tractor. Parallelogram arm 93 in FIG. 1 and the arm 130 in FIG. 6 may then be lowered into the ditch without scraping the ground at the top of the ditch. This is impossible with any prior known cable plow.

All parts of the apparatus are readily movable to positions within the width of the tractor so that they do not interfere with travel on a road or street. After plowing on the right side of the tractor as shown in FIGS. 2 and 3, the retracted piston rod 41 may be extended to shift hitch block 30 leftward sufficiently to bring extension arm 50 within the width of the tractor. In plowing on the left side of the tractor, anchor bar 45 would be in opening 48 and piston rod 41 would be fully extended to the left to position hitch block 30 at the left end of track bar 20. Extension arm 50 would be in position 50b in the hitch block, in FIG. 3, extending beyond the left side of the tractor. Then, by retracting piston rod 41, extension arm 50 would be brought within the width of the tractor.

Also, the same result may be accomplished by shifting the pin 54, without operating piston rod 41. After plowing on the right side of the tractor, extension arm 50 may be swung around on pin 53 to its 50a position with pin 54 shifted from hole 62 to hole 65. After plowing on the left side of the tractor, extension arm 50 may be swung around from position 50b to position 50c, shifting pin 54 from hole 64 to hole 65. Hitch block 30 does not project appreciably beyond the side of the tractor in either its extreme right or extreme left position.

When extension arm 50 is not needed it may be removed and the free swinging hinge pin 70 may be placed directly in any one of hitch block holes 62, 64 or 65, in both embodiments.

Hydraulic connections to the various cylinders have not been shown as these are conventional. It is understood that a pair of flexible hydraulic hose lines is connected to opposite ends of each cylinder and that the tractor is equipped with a hydraulic pump and manual valves convenient to the operator for introducing hydraulic pressure into selected hose lines for extending and retracting the various piston rods in the manner described.

I claim:

1. Cable plow apparatus comprising a track bar adapted for mounting in transverse position on the back of a tractor, a hitch block slidable on said track bar, a first cylinder and piston for shifting said hitch block along said track bar, a vertical hinge pin, means on said hitch block for mounting said hinge pin, a first pivot member mounted on said hinge pin for free swinging movement, a draft arm having horizontal pivot connection in its forward end with said pivot member, a second pivot member having horizontal pivot connection with the rear end of said draft arm, a cable laying paravane plowshare having vertical pivot connection with said second pivot member, a second cylinder and piston connected between said second pivot member and said plowshare for swinging said plowshare on said second pivot member, a linkage including said draft arm and said first and second pivot members for maintaining said vertical pivot connection of said plowshare in vertical position when said draft arm pivots up and down on said horizontal pivot connection in the forward end of the draft arm, said linkage including cylinder and piston means arranged for raising and lowering said plowshare in parallel movement to working positions at different levels in the ground, and said linkage including cylinders and piston means arranged to pivot said plowshare upward to inoperative position above the ground, said linkage further comprising a cylinder and piston connected between said first pivot member and said draft arm for pivoting said draft arm on said horizontal pivot connection in its forward end, and a cylinder and piston connected between said second pivot member and said draft arm for pivoting said second pivot member on said horizontal pivot connection in the rear end of the draft arm.

2. Apparatus as defined in claim 1, said track bar comprising a pair of vertically spaced upper and lower hollow box beams, said first cylinder and piston being disposed between said beams, and a removable anchor bar in said beams detachably connected with said cylinder.

3. Apparatus as defined in claim 1, said means for mounting said hinge pin comprising holes in said hitch block receiving said pin.

4. Apparatus as defined in claim 1, said means for mounting said hinge pin comprising an adjustable extension arm on said hitch block to position said hinge pin beyond either side of the tractor.

5. Plow apparatus comprising a vertical hinge pin adapted for mounting on a tractor hitch, a first pivot member mounted for free swinging movement on said pin, a lower arm having a forward end with horizontal pivot connect to said first pivot member, a second pivot member having horizontal pivot connection with the rear end of said arm, a plowshare having vertical pivot connection with said second pivot member, a cylinder and piston connected between said second pivot member and said plowshare for swinging said plowshare on said vertical pivot, an upper arm having a rear end with horizontal pivot connection to said second pivot member, an arm having horizontal pivot connections with forward end portions of said upper and lower arms, said last arm, second pivot member and upper and lower arms forming a parallelogram linkage for varying the vertical position of the plowshare in plowing, a variable length linkage connected between the forward end of said upper arm and said first pivot member, and a cylinder and piston arranged to adjust the length of said variable length linkage for raising and tilting the plowshare to inoperative position.

6. Apparatus as defined in claim 5, said variable length linkage comprising a toggle linkage, said last cylinder and piston means being arranged to fold and straighten said toggle.

7. Apparatus as defined in claim 5 including cylinder and piston means connected to said parallelogram linkage and arranged to raise and lower said plowshare in parallel movement to working positions at different levels in the ground.

8. Cable plow apparatus comprising a vertical hinge pin adapted for mounting on a tractor hitch, a first pivot member mounted for free swinging movement on said pin, a draft arm having a forward end with horizontal pivot connection to said first pivot member, a second pivot member having horizontal pivot connection with the rear end of said arm, a cable laying paravane plowshare having vertical pivot connection with said second pivot member, a cylinder and piston connected between said second pivot member and said plowshare for swinging said plowshare on said vertical pivot, a cylinder and piston connected between said first pivot member and a mid portion of said draft arm for pivoting the draft arm on said horizontal pivot connection on its forward end, and a cylinder and piston connected between said second pivot member and a mid portion of said draft arm for pivoting said second pivot member on said horizontal pivot connection with the rear end of the draft arm, upward pivotal movement of both the draft arm and second pivot member pivoting the plowshare upward to inoperative position above the ground and opposite pivotal movements of said draft arm and second pivot member raising and lowering said plowshare in parallel movement to working positions at different levels in the ground.

9. The apparatus defined in claim 8, said tractor hitch comprising a track bar adapted for mounting in transverse position on the back of a tractor, said track bar comprising a pair of vertically spaced upper and lower beams, a hitch block slidable on said track bar and having a portion disposed between said beams, a vertical anchor bar removably mounted in said beams, and a horizontal cylinder and piston between said beams connected between said anchor bar and hitch block, said hitch block having a plurality of holes spaced apart lengthwise of said track bar for receiving vertical connector pins in selected positions.

10. Plow apparatus as defined in claim 9, said beams having a plurality of aligned vertical openings to receive said anchor bar in different positions along the beams.

11. Plow apparatus as defined in claim 9, including an extension arm having an outboard end extending beyond the side of the tractor and equipped with a hole to receive said vertical hinge pin for pulling said plowshare offset beyond the side of the tractor, the inboard end of said arm having spaced holes, and vertical pins in said spaced holes in said arm and hitch block securing said arm to said hitch block.

12. Plow apparatus as defined in claim 11, said extension arm being pivotally adjustable on said hitch block by placing one of said inboard pins in different ones of said hitch block holes.

13. Plow apparatus as defined in claim 11, said hitch block holes being arranged for the selective positioning of said extension arm to project beyond either the right or left side of the tractor when the hitch block is shifted to the corresponding end of said track bar.

14. A cable plow as defined in claim 8, said tractor hitch comprising a track bar in transverse position relative to the tractor, said track bar having a length less than the width of the tractor, a hitch block slidable on said track bar, and an extension arm on said hitch block having an outboard end projecting beyond said side of the tractor, said vertical hinge pin being mounted on said outboard end of said extension arm, said outboard end of said extension arm being movable to a position within the width of the tractor.

15. A cable plow as defined in claim 14, said hitch block being elongated in the direction of said track bar, and means for pivotally mounting said extension arm selectively on the opposite ends of said hitch block.

16. A cable plow as defined in claim 15, said pivotal mounting means comprising a pair of holes in said extension arm, a plurality of pairs of holes in said hitch block, and a pair of pins for insertion in said holes.